United States Patent

[11] 3,584,442

| [72] | Inventor | Richard S. White<br>New Canaan, Conn. |
|---|---|---|
| [21] | Appl. No. | 12,901 |
| [22] | Filed | Feb. 18, 1970 |
| [45] | Patented | June 15, 1971 |
| [73] | Assignee | AEL Food Automation Inc.<br>Norwalk, Conn.<br>Continuation of application Ser. No. 633929, Apr. 26, 1967, now abandoned. |

[54] METHOD AND APPARATUS FOR PICKING CITRUS FRUIT
9 Claims, 9 Drawing Figs.

[52] U.S. Cl. ................................................. 56/1, 36/328
[51] Int. Cl. .................................................. A01g 19/08
[50] Field of Search ........................................ 56/1, 327, 328, 330, 331

[56] References Cited
UNITED STATES PATENTS

| 2,996,868 | 8/1961 | Voelker | 56/328 |
| 3,114,998 | 12/1963 | Weisser | 56/329 |
| 3,269,099 | 8/1966 | Fricks | 56/1 |
| 3,496,705 | 2/1970 | Perrelli | 56/1 |

Primary Examiner—Russell R. Kinsey
Attorney—Robertson, Bryan, Parmelee & Johnson ABSTRACT: This invention relates to a method and apparatus for picking citrus fruit by submerging the trees temporarily in water. The invention has special application to picking oranges and grapefruit utilizing the buoyancy of the fruit in water and utilizing the water to aid in controlling motion of the tree during picking of the fruit and to provide a buoyant cushion for the fruit itself.

PATENTED JUN 15 1971 3,584,442

INVENTOR.
RICHARD S. WHITE
BY
Robertson, Bryan, Parmelee & Johnson
ATTORNEYS.

INVENTOR.
RICHARD S. WHITE
BY
Robertson, Bryan, Parmelee & Johnson
ATTORNEYS.

METHOD AND APPARATUS FOR PICKING CITRUS FRUIT

This is a continuation of application Ser. No. 633,929 filed Apr. 26, 1967 now abandoned.

SUMMARY

Prior to this invention the apparatus for picking oranges and grapefruit have included tree-shaking devices which are clamped onto the tree and serve to shake the tree back and forth with a large amplitude and substantial force, such that the inertia and momentum of the individual fruit cause many of them to become snapped off from their stems. Other prior apparatus has been the wind-generating type of equipment which utilizes a large engine and a propeller to generate a powerful blast of air that is directed at the tree. Then a shutter mechanism intermittently interrupts the blast so that the tree is violently oscillated back and forth by a sequence of short blasts, causing much of the fruit to be shaken off. Another type of prior apparatus uses numerous large, closely spaced, rotating augurs acting like archimedean screws to engage and pull the fruit out toward the frame which supports these screws.

The difficulties of these prior apparatus have been that they damage the tree by injuring the bark and branches, tearing off leaves and buds and loosening the roots from the soil. In the case of certain species such as the Valencia Orange and Marsh Grapefruit the blooms or new growth for next year's crop are present on the tree at the picking season, and the above prior apparatus severely damage next year's crop. Also, in many cases the picked fruit itself becomes bruised and damaged by falling upon lower branches. Attempts have been made to catch the falling fruit by placing soft padded panels beneath the lowermost branches, but these do not protect that portion of the fruit which falls from the upper branches so as to strike the intervening branches, foliage and fruit. In addition a substantial proportion of the skins are split by impact of the fruit upon the mechanical catching surface.

A further difficulty with the prior apparatus is that it does not accurately reproduce the deft picking motion with which an experienced hand picker separates the fruit cleanly from the stem. If the fruit is picked with a portion of the stem still attached, the resulting fruit is unattractive for sale to the public, and the protruding stub of the stem will puncture the skins of adjacent fruit during packing. Fungi will enter the fruit through the wound in the skin, and the fruit quickly becomes spoiled. Another problem is that a flap of the skin remains attached to the stem on the tree as the fruit is pulled from the branch, or the skin is torn as the stem breaks loose, causing the fruit to be unacceptable even for canning purposes, because fungi will quickly enter through the gap. This accidental tearing of the skin or a removal of a flap or plug of the skin is called "plugging" and is said to produce "plugged" fruit.

When a skilled hand picker picks the fruit, he turns the fruit up toward the stem while at the same time pulling down on it, causing a clean break away from the stem at the bud point. This action turns the fruit about an axis parallel with the ground, while the fruit is being pulled from the stem, and the combined turning movement and pull breaks the juncture between stem and fruit at the bud point immediately adjacent to the fruit without plugging the fruit.

According to my invention a level of water is raised surrounding the tree and its branches creating a buoyant lifting action on the mature fruit borne by the tree. The water is agitated for removal of the fruit, and the picked fruit becomes gently floated on the surface of the water to protect it from bruising by avoiding falling impact upon lower branches. In the performance of this method as described herein the water may be agitated in various ways or modes, and for desired picking effects a combination of agitation modes is applied in certain cases depending upon the characteristics of the particular trees and the type of orange or grapefruit, as the case may be.

Another aspect of the invention resides in the concept of the apparatus by which the method can best be performed. This apparatus includes a large cylindrical container having a split base area adapted to be placed around the trunk of the tree and laid down on the ground with a sealing collar device for making a substantially watertight seal against the trunk. Devices are associated with the container for agitating the water as the tank is being filled or thereafter if desired for removal of the fruit during the filling or emptying cycle.

Among the advantages of the present invention are those resulting from the fact that the fruit is separated cleanly from the stem and is buoyantly supported so as to protect all of the picked fruit from damage. The buoyant action combined with the agitation of the water provides a turning and pulling movement on the fruit which separates the fruit from the stem at the bud point without plugging as desired. Moreover, this picking operation is accomplished economically with a minimum of hand labor.

DESCRIPTION

In this specification and in the accompanying drawings, are described and shown a method and apparatus for picking oranges and grapefruit embodying the present invention, and it is to be understood that this disclosure is not intended to be exhaustive nor limiting of the invention, but on the contrary is given for purposes of illustration in order that others skilled in the art may fully understand the invention and the manner of applying the method and apparatus in practical use and will understand how to modify and adapt the illustrative embodiments of the invention as may be best suited to those conditions which are present in a particular grove and type of citrus trees and fruit.

The various objects, aspects, and advantages of this invention will be more fully understood from a consideration of the following specification in conjunction with the accompanying drawings, in which:

FIG. 7 illustrates an embodiment of the invention utilizing the water to control motion of the tree and to cushion the fruit.

Figures 1, 2:
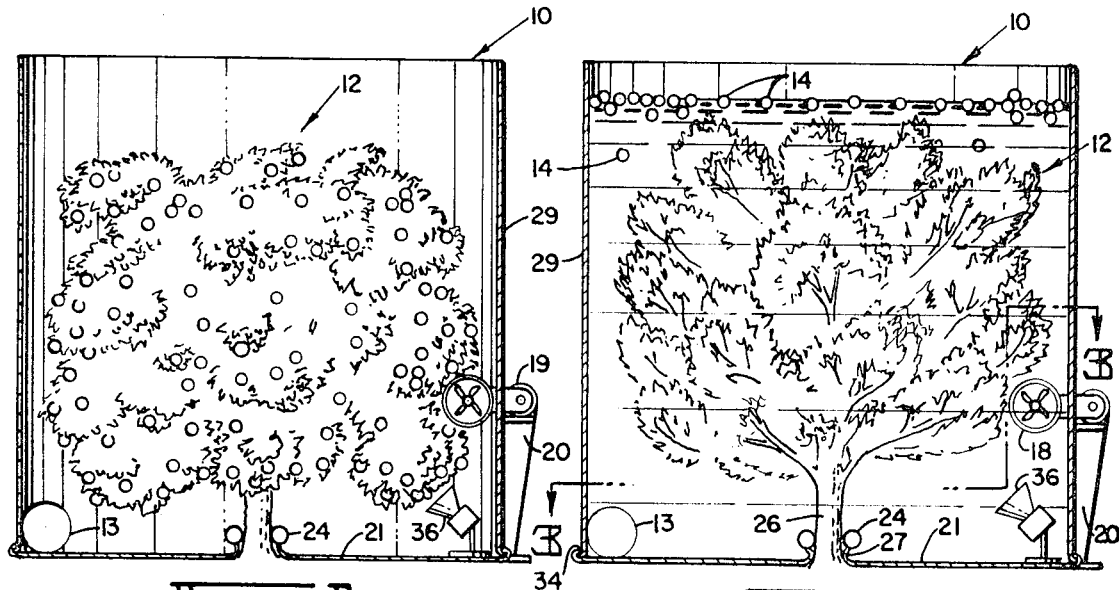
FIG. 1 is a vertical sectional view of a large cylindrical container surrounding an orange tree bearing mature fruit ready to be picked.
FIG. 2 is a similar view showing a body of water surrounding the tree and its branches.
Figure 3:
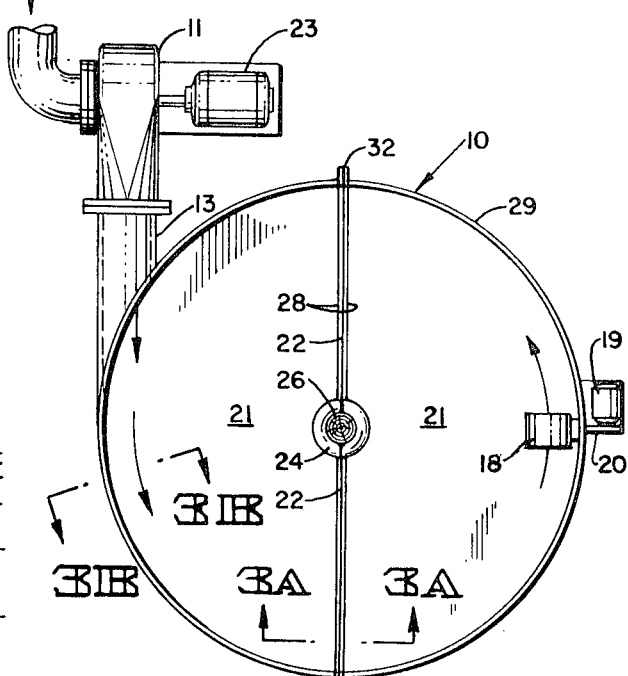
FIG. 3 is a plan sectional view of the container and tree trunk taken generally along the broken line 3-3 of FIG. 2 and showing the circulation of water concentric with the trunk.
Figure 2:
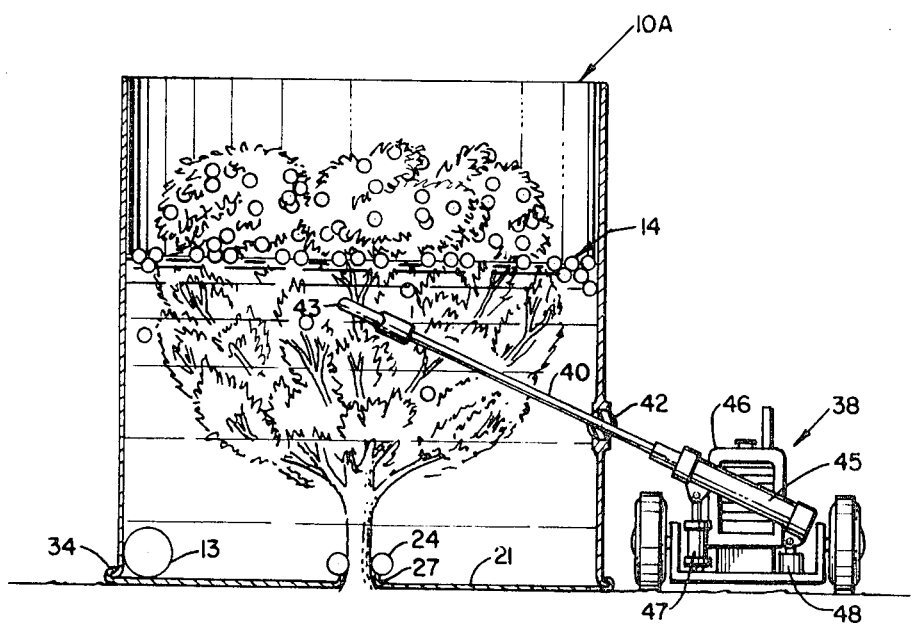

As shown in FIGS. 1, 2 and 3, in accordance with the invention a large cylindrical container 10 is placed around an orange or a grapefruit tree 12 for confining water in a region immediately surrounding the tree. Water is introduced at a high flow rate through a large conduit 13 directed tangentially into the container so that the water is agitated by a powerful swirling movement concentric about the tree trunk as the level rises about the branches. A large capacity pump 11 driven by a motor 23 may be used to provide a fast flow through the conduit 13. The fruit 14 is lifted by its buoyancy resulting from displacement of water and it is illustratively shown as oranges each on a stem 15.

Figure 4:
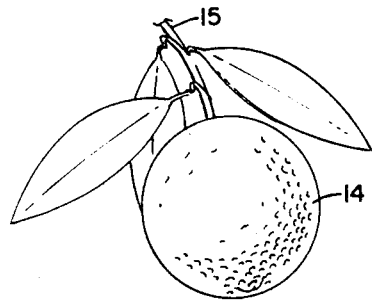
FIGS. 4, 5 and 6 show a sequence of movements of the fruit as the agitated water level rises above it.
Figure 5:
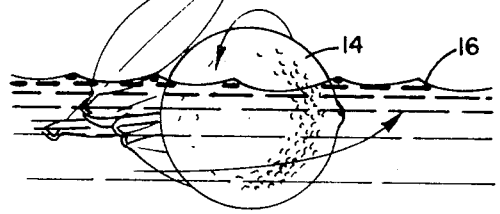
Figure 6:
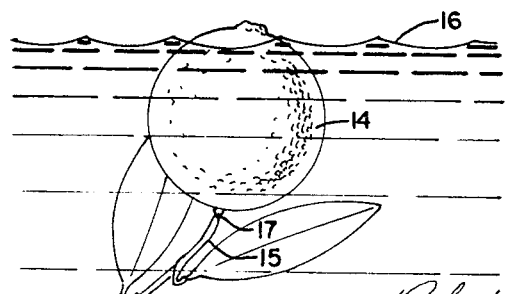

In FIGS. 4, 5 and 6 are shown the sequence of movements of an orange 14 as the level 16 of the agitated water rises above the orange and its stem 15. This produces a combined turning of the fruit about an axis perpendicular to the length of the stem 15 plus a lifting pulling action so as to produce a clean separation at the bud point 17. The agitation of the rising water may be increased by a propeller in a cowling 18 located on the opposite side of the container from the inlet of the conduit 13 and driven by a motor 19 on a support 20.

The fruit 14 after separation from its stems floats on the surface of the water as shown in FIG. 2 where it is readily collected.

The container 10 which is shown includes a base area 21 of flexible, strong waterproof material, for example such as a wire cloth coated with a resilient durable covering of rubber, polyethylene or the like. This base area 21 has a generally circular shape with a split or joint 22 extending radially from opposite sides of a sealing collar 24.

In use the two halves of the base area 21 are placed down on the ground surrounding the trunk 26 and the sealing collar 24 is wrapped tightly around the trunk. This collar includes a skirt 27 which extends down from the collar around the trunk and is attached to the base area 21. In this example the sealing collar 24 comprises a length of large diameter expansible hose which is inflated with air under pressure like an automobile inner tube after it has been securely wrapped around the trunk. This pneumatic expansion of the collar 24 causes it to tighten around the trunk 26 to provide a watertight seal between the base area 21 and the trunk.

Figure 3A:
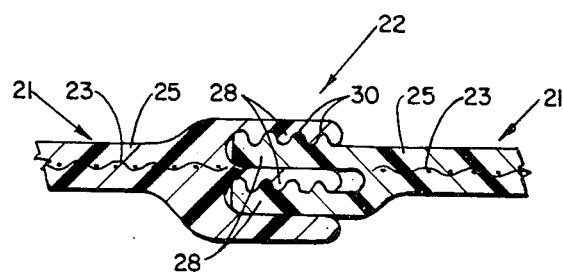
FIGS. 3A and 3B are enlarged partial sectional views taken along the lines 3A-3A and 3B-3B.

As shown in FIG. 3A, the joint 22 is formed by several mating flaps 28 on the two halves 21 of the base which are interleaved to form a substantially watertight connection. These flaps have longitudinal beads 30 extending parallel with the joint 22 which mesh together to prevent the escape of water out through the overlapped flaps. In FIG. 3A is also seen the reinforcing layer 23 of material capable of sustaining tension loads, for example of wire cloth or mesh, coated with a resilient durable covering 25 of rubber, polyethylene or the like.

Figure 3B:
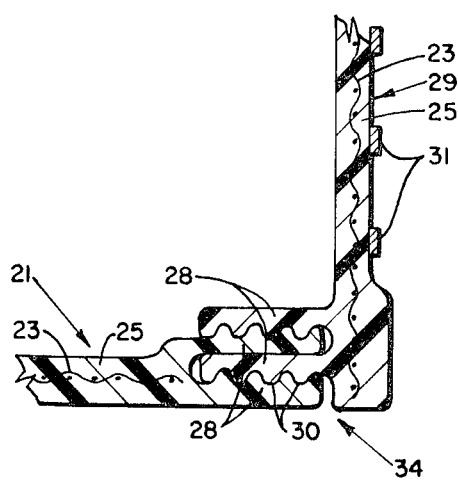

A substantially watertight cylindrical wall 29 in two halves is utilized to form the container 10. In this embodiment of the invention this wall 29 is shown as being of waterproof material similar to the base area, the two halves being connected along vertical joints 32 which are like the base joints 22, except that these joints 32 and the wall 29 are reinforced by numerous hooplike cables 31 (FIG. 3B) connected to surround the container 10 so as to resist tension forces developed circumferentially in the wall when the container is filled with water. The wall 29 as shown has sufficient rigidity in the axial direction to be self-standing. In cases where a more flexible wall structure is employed support posts are positioned adjacent to the periphery of the container and are attached to the top of the wall, as will be understood. As shown in FIG. 3B, there is a connection 34 between the lower edge of the wall 29 and the base area 21 which includes interleaving flaps 28 on the bottom of the wall 29 and near the perimeter of the base area 21 having interlocking beads 30. While the container 10 is being assembled, a man may remain inside of it to make sure that the joints are properly interconnected so as to minimize leakage. After assembly is complete he is hoisted out.

In addition to the swirling mode of agitation of the water, mechanical vibrations may be generated in the water to aid in separating the fruit from the stem at the budpoint 17. As shown in FIG. 2 these are generated by a vibration generator 36 which may be driven electromagnetically in the manner of a loudspeaker to produce vibrations in the water surrounding the fruit.

Prior to drawing the water out of the container 10, a similar container is set up around an adjacent tree in the grove, and the conduit 13 is connected through the pump 11 to the conduit on the adjacent container. Thus, the water flows from the container 10 to the next one. As the levels in the two containers approach the same height, the pump is turned on to speed up and complete the transfer of the water out of the container 10 into the next one. In this way most of the water is reused over and over again to pick the oranges or grapefruit in an entire grove.

As soon as the container 10 is empty, it is disassembled and set up around another tree ready to repeat the steps of the picking process.

In the embodiment of the invention as shown in FIG. 7 the container 10A is similar to the container 10, except that provision is made for use of a tree shaker machine 38 having a reciprocatable boom 40 extending through a side seal 42 in the container. A padded tree clamp 43 temporarily secures the end of the boom 40 to the trunk at a convenient height. The boom is adapted to be reciprocated longitudinally by means of reciprocating drive means 44 in the form of a pneumatic cylinder 45 mounted upon a self-propelled vehicle 46. There is a large mass in the base of the cylinder 45 to stabilize this drive means against undue motion when the tree is being shaken. Also, the drive means 45 can be adjusted in position on the vehicle 46 by adjustable mounting members 47 and 48, so as to align the boom 40 with the seal 42 and with the desired point of attachment to the tree trunk.

The seal 42 permits longitudinal movement of the boom 40 while preventing any substantial leakage of water. This seal is adapted to be opened up after the water level has been lowered below it to enable the boom 40 to be removed in readiness for the machine 38 to be driven on to the next tree.

When using the method illustrated in FIG. 7 the level of the water is changed as the tree is being shaken back and forth by the machine 38. The water level acts as a motion damping medium to control the amplitude of back and forth movement of the lower portions of the tree. Also the water imposes a force on the fruit as the tree is being moved to aid in loosening the fruit 14 from their stems 15. As shown in FIG. 7 the water level is being lowered as the tree is being shaken by the machine 38. The picked fruit 14 (FIG. 7) is cushioned by its buoyancy to prevent injury. When the container 10A has been emptied, it is disassembled and set up around another tree ready to repeat these steps of the picking process.

Advantageously, the weight load of the water in the container 10 and 10A holds the soil firmly down in compact relationship about the roots of the tree so as to protect the roots from loosening and damage during the picking process.

The terms and expressions which I have employed are used in a descriptive and not in a limiting sense, and I have no intention of excluding equivalents of the invention described and claimed.

I claim:

1. The method of picking oranges and grapefruit from trees which comprises the steps of
   a. raising a level of a body of water upwardly surrounding the tree and its branches creating a buoyant lifting action on the fruit which is attached to the branches,
   b. confining the water to a region immediately surrounding the tree,
   c. agitating the water for removal of the fruit from the branches, and
   d. floating the picked fruit on the surface of the water to protect the fruit from bruising by avoiding falling impact upon lower branches.

2. The method of picking oranges and grapefruit from trees according to claim 1, in which the step of agitating the water comprises
   e. swirling the body of water as a whole in a generally cylindrical swirl pattern concentric about the trunk.

3. The method of picking oranges from trees according to claim 1, in which the step of agitating the water includes
   f. generating intense mechanical vibrations in the water for loosening the fruit from its stems.

4. The method of picking oranges from trees according to claim 2, in which intense mechanical vibrations are generated in the whole swirling body of water.

5. The method of picking oranges and grapefruit from citrus trees which comprises the steps of
   a. confining water to a region immediately surrounding the tree,
   b. shaking the fruit to separate the fruit from its stems,
   c. changing the level of the water during the shaking, and
   d. cushioning the loosened fruit from damage by buoyantly floating the fruit in the water.

6. The method of picking fruit from citrus trees as claimed in claim 5, and including the steps of
  e. mechanically shaking the tree trunk for shaking the fruit, and
  f. imposing the weight of the water as a distributed load upon the soil about the base of the trunk for holding the soil in place about the roots during the shaking of the tree.

7. The method of picking oranges and grapefruit from trees as claimed in claim 5, wherein the level of the water is lowered as the fruit is being shaken.

8. The method of picking oranges and grapefruit from citrus trees which comprises the steps of:
  a. providing a container around the tree,
  b. providing water within the container in a region immediately surrounding the tree and its branches creating a buoyant lifting action on the fruit on the branches,
  c. floating the removed fruit on the surface of the water to protect the fruit from damage due to falling, and
  d. collecting the fruit from the water.

9. The method of picking oranges and grapefruit from citrus trees as claimed in claim 8, in which the water is removed from the region immediately surrounding the tree and its branches by withdrawing the water and introducing the withdrawn water into another container around another tree.